Patented May 26, 1953

2,640,005

UNITED STATES PATENT OFFICE 2,640,005

SUCCINHYDRAZIDES

Waldo B. Ligett, Berkley, Rex D. Closson, Detroit, and Calvin N. Wolf, Ferndale, Mich., assignors to Ethyl Corporation, New York, N. Y., a corporation of Delaware No Drawing. Application October 28, 1950,
Serial No. 192,806

9 Claims. (Cl. 167—33)

This invention relates to novel substituted succinhydrazides. In particular our invention relates to a novel class of compounds which have utility as fungitoxicants, methods of formulating such compounds into useful fungicides and methods of their application.

The compounds of our invention comprise the class of mono- and disubstituted 1,2,4,5-tetrahydropyridazine-3,6-diones, and are characterized by being potent biocides, being particularly effective against fungus organisms. Our compounds can be described by the general formula

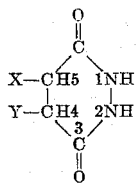

wherein the substituents X and Y are the same or different, and are selected from hydrogen, alkyl, alkenyl and negative radicals, but not more than one of X or Y is hydrogen. By alkyl group we mean straight chain, branched chain or cyclic saturated hydrocarbon radicals, while we refer to straight chain, branched chain or cyclic hydrocarbon radicals, containing one or more points of unsaturation, as alkenyl groups. Among the negative radicals which comprise certain embodiments of the novel compounds of our invention we include the halogens, the sulfhydryl group (—SH), mercaptans (—SR), the trichloromethylthio (—SCCl3) group, alkyl- and aryloxy, acyloxy and aroyloxy (RCOO—), nitroso, nitro, amino, and mono- and di-substituted amino.

Correct nomenclature for the compounds of our invention requires that they be referred to as derivatives of 1,2,4,5-tetrahydropyridazine-3,6-dione, wherein one or more substituents are substituted in the 4-, or 4,5-positions, that is, at least one of the methylene groups is substituted. However, for the sake of brevity we can refer to the compounds of our invention as substituted succinhydrazides. Thus, our compounds are referred to as 4-, and 4,5-substituted succinhydrazides.

One method of synthesizing the substituted succinhydrazides of our invention comprises treating hydrazine or hydrazine hydrate with the anhydride of the appropriately substituted succinic acid. Reaction proceeds readily in most cases, and requires the use of a solvent to moderate the exothermic reaction.

A wide variety of radicals can be substituted in the 1,2,4,5-tetrahydropyridazine-3,6-dione structure to produce novel materials, useful as fungicidal agents, and possessing wide utility as intermediates in chemical synthesis. Illustrative of these substituents are the halogens. Thus, fluorine, chlorine, bromine, or iodine can be introduced singly into the 4-position, or in pairs to the 4- and 5-positions. Likewise, in the dihalogen substituted embodiments of our compounds, we can employ two different halogens, thus forming, for example, the 4-chloro-5-fluoro-, 4-chloro-5-bromo-, 4-chloro-5-iodo-, 4-bromo-5-iodo-, 4-bromo-5-fluoro-, and 4-fluoro-5-iodo-succinhydrazides.

Other useful embodiments of our novel compounds comprise those in which one or more sulfur containing groups are in the 4- or 5-, or 4,5-positions. Such sulfur containing groups include, for example the sulfhydryl group, the trichloromethylthio group, and substituted mercapto group, wherein R is alkyl, such as, for example, methyl, ethyl, propyl, n-butyl, i-butyl, amyl, hexyl, dodecyl, benzyl, or phenylethyl, or aryl or substituted aryl, typical examples of which are phenyl, tolyl, xylyl, and naphthyl.

Further typical examples of substituent groups which can be substituted in the 4-, 5-, or 4,5-positions of our novel compounds comprise alkyl, alkenyl, alkoxy, aryloxy and acyloxy and aroyloxy groups. Among the alkyl groups, we can substitute for example methyl, ethyl, propyl, isopropyl, butyl, and amyl groups, while the alkenyl embodiments can include such typical examples as propenyl, butenyl, sec.-butenyl, and cyclohexenyl. Typical examples of alkoxy groups which we employ comprise methoxy, ethoxy, propoxy, isopropoxy, allyloxy, 2-methylhexoxy, β-chloroethoxy, β-aminoethoxy, and benzyloxy. As aryloxy substituents we can employ such typical groups as phenoxy, 4'-isopropylphenoxy, 2',4'-dichlorophenoxy and 3'-nitrophenoxy. Among the acyloxy and aroyloxy groups we can employ in the 4-, 5-, or 4,5-positions of our 1,2,4,5-tetradihydropyridazine - 3,6 - diones, representative members include acetoxy, mono-, di- and trichloroacetoxy, propionoxy, lauroyloxy, α-toluyloxy, benzoyloxy, toluyloxy, xyloloxy, anisoyloxy, anthranoyloxy, 4'-chlorobenzoloxy and 2'-hydroxybenzoyloxy.

Among nitrogen containing groups which we can substitute in the 4-, 5-, or 4,5-positions of our succinhydrazides typical examples include the nitroso, nitro and amino groups. The amino groups can be unsubstituted or can comprise the mono- and di-alkyl and aryl or aryl alkyl amines. Illustrative of such amine groups are methylamino, ethylamino, hexylamino, N-methyl-N-ethylamino, isopropylamino, cyclohexylamino, 2'-methylhexylamino, β-hydroxyethylamino, anilino, N-phenyl-N-methylamino, piperidyl, morpholino, and pyridyl.

As pointed out in describing our halo-, dihalo- and mixed halo-substituted compounds, the various alkyl, alkenyl and negative radicals of the compounds of our invention can also be co-substituted in many variations and combinations on the 4-, 5-, or 4,5-positions of our succinhydrazides.

To illustrate one method of preparing the substituted succinhydrazides of our invention the following examples are presented wherein all parts and percentages are by weight.

Example I

*4,5-dichlorosuccinhydrazide.*—To a solution of 40 parts of $\alpha,\alpha'$-dichlorosuccinic anhydride in 440 parts of benzene was added with efficient stirring, over a period of 15 minutes, a solution of 14 parts of 85 per cent hydrazine hydrate in 79 parts of ethyl alcohol. The mixture spontaneously warmed to 35° C. The mixture was then stirred for one hour at a temperature of 25° C., and the temperature was raised to reflux temperature for an additional period of one hour. After cooling to 25° C., the solid product was filtered and washed with a small amount of benzene. The yield of product, obtained as a yellow crystalline solid having a melting point of 260 to 263° C., was 17 parts or 39 per cent based on the $\alpha,\alpha'$-dichlorosuccinic anhydride. The product contained 41 per cent chlorine, while the formula $C_4H_4O_2N_2Cl_2$ requires 39 per cent chlorine.

Example II

*5 - alkenylsuccinhydrazide.*—An $\alpha$-alkenylsuccinic anhydride (50 parts) wherein the alkenyl group was a mixture of twelve to fourteen carbon atom unsaturated aliphatic radicals was dissolved in 200 parts of n-butanol. To this solution, at reflux temperature was added, with stirring, 10 parts of hydrazine hydrate in 40 parts of ethanol. After proceeding as in the foregoing example the product, a 5-alkenylsuccinhydrazide separated as a viscous oil in 85 per cent yield. This product was recovered by decantation.

Other substituted succinic anhydrides can be condensed with hydrazine hydrate according to the procedure of the foregoing examples to produce other succinhydrazides of our invention. Thus, for example, when each of $\alpha$-chloro-, $\alpha$-chloro-$\alpha'$-bromo-, $\alpha$-fluoro-$\alpha'$-nitro-, $\alpha$-nitro-, $\alpha$-mercapto-, $\alpha$-trichloromethylthio-, $\alpha$-methoxy-$\alpha'$-nitro-, $\alpha,\alpha'$-diacetoxy-, $\alpha$-anilino-$\alpha'$-iodo-, $\alpha$-nitroso-$\alpha'$-chloro-, $\alpha$-methylmercapto-, $\alpha$-(N-methyl-N-butylamino)-$\alpha'$-nitro-, $\alpha$-methyl-, $\alpha$-chloro-$\alpha'$-butenyl-, $\alpha$-cyclohexyl-$\alpha'$-acetoxy-, and $\alpha$-amino-succinic anhydride is treated in benzene or an alcohol solution with a solution of hydrazine hydrate in ethyl alcohol there is obtained, respectively, 4 - chloro-, 4 - chloro-5-bromo-, 4-fluoro-5-nitro-, 4-nitro-, 4-mercapto-, 4-trichloromethylthio-, 4-methoxy-5-nitro-, 4,5-diacetoxy-, 4-anilino - 5 - iodo-, 4 - nitroso-5-chloro-, 4 - methylmercapto-, 4-(N-methyl-N-butylamino)-5-nitro-, 4 - methyl-, 4-chloro-5-butenyl-, 4-cyclohexyl-5-acetoxy-, and 4-amino-succinhydrazide.

The compounds of our invention can be employed as fungicides and for the prevention of the germination of the spores of fungi. To demonstrate the utility of the succinhydrazides of our invention as fungicidal compositions we determined the concentration at which the germination of 50 per cent of the spores of each of the fungi *Alternaria oleracea* and *Sclerotinia fructicola* is inhibited. The former is responsible for the potato blight, while the latter causes peach rot. These fungi are representative of fungus types which are responsible for heavy crop damage. The ability to control these fungi is a reliable indication of the general applicability of our fungicides to protect these and other important agricultural crops. These tests were conducted as follows: 100 parts of the active ingredient was triturated with 1,000 parts of distilled water containing one part of the commercial dispersant Triton X-100. This standard suspension was thereupon further diluted with distilled water and the concentration at which one-half of the fungi contained in a drop of water on a microscope slide were prevented from sporilating was determined. For example, under these conditions 4,5-dichloro-succinhydrazide was effective at a concentration as low as 10 p. p. m. When the following typical examples of the compounds of our invention are so-applied to cultures of these fungi, they are also effective at a similar low concentration: 4-chloro-, 4,5 - dibromo-, 4-amino-, 4-trichloromethylthio-, 4 - nitro-5-chloro-, 4-butylmercapto-, 4 - methylamino-5-nitro-, 4-nitroso-5-mercapto- and 4,5-diacetoxy-succinhydrazide.

Other examples of the novel class of compounds which we have provided will be apparent, those specific examples enumerated herein being merely illustrative. Furthermore, other methods for their preparation will be apparent to those skilled in the art, and the foregoing examples of preparation are presented merely to illustrate one method for their preparation.

We claim:

1. As new compositions of matter, 1, 2, 4, 5-tetrahydropyridazine-3,6-diones in which at least one of the methylene groups is substituted with a member selected from the class consisting of lower alkyl, lower alkenyl and halogen radicals.

2. The composition of claim 1 in which at least one of the methylene groups is substituted with a lower alkenyl radical.

3. The composition of claim 1 in which at least one of the methylene groups is substituted with a halogen radical.

4. A fungicidal composition containing as the principal fungicidal agent the composition of claim 1.

5. The method of treating materials susceptible to fungus attack with a fungicidal composition containing as the principal active ingredient the composition of claim 1.

6. The composition of claim 1 in which at least one of the methylene groups is substituted with a lower alkyl radical.

7. A process for the manufacture of 1,2,4-5-tetrahydropyridazine-3,6-dione in which at least one of the methylene groups is substituted with a member selected from the group consisting of lower alkyl, lower alkenyl and halogen radicals which comprises reacting a member selected from the group consisting of hydrazine and hydrazine hydrate with a succinic anhydride wherein at least one of the methylene groups of said succinic anhydride is substituted with a member selected from the group consisting of lower alkyl, lower alkenyl and halogen radicals.

8. 4,5-dichlorosuccinhydrazide.

9. Alkenyl succinhydrazide wherein said alkenyl group contains from 1 to 14 carbon atoms.

WALDO B. LIGETT.
REX D. CLOSSON.
CALVIN N. WOLF.

References Cited in the file of this patent

Feuer et al., J. Am. Chem. Soc. 73, 4716–4719 (1951).

Sernagiotto et al., Gazz. Chim. et al. 44, 538 (1914).

Curtius, J. Prakt Chem. (2) 92, 80 (1915).

Beilstein, Vierte Auflage. vol. 24, p. 312.

Hoffmann, Science 109, 588–590 (1949).